United States Patent [19]

Bolon et al.

[11] 4,433,131

[45] Feb. 21, 1984

[54] COATING SOLUTION OF POLYETHERIMIDE MONOMERS

[75] Inventors: Donald A. Bolon; Thomas B. Gorczyca, both of Schenectady, N.Y.

[73] Assignee: General Electric Company, Schenectady, N.Y.

[21] Appl. No.: 288,707

[22] Filed: Jul. 30, 1981

[51] Int. Cl.³ .............................................. C08G 73/10
[52] U.S. Cl. ............................ 528/185; 174/110 SR; 174/110 N; 252/188.31; 428/375; 524/600; 528/26; 528/128; 528/170; 528/172; 528/208; 528/125
[58] Field of Search ............... 528/125, 126, 128, 170, 528/26, 172, 185, 208; 174/110 SR, 110 N; 428/375; 252/188.3 R; 524/600

[56] References Cited

U.S. PATENT DOCUMENTS 3,498,948 3/1970 Minami et al. ........................ 528/185
4,157,996 6/1979 Boldebuck et al. .................. 528/185

Primary Examiner—Lester L. Lee
Attorney, Agent, or Firm—Richard J. Traverso; James C. Davis, Jr.; James Magee, Jr.

[57] ABSTRACT

Disclosed is a coating solution including an aromatic bis(ether anhydride) component, an organic diamine component, an organic triamine component, and a solvent system, and optionally water which may be coated on a substrate and polymerized to form high quality polyetherimide coatings.

19 Claims, No Drawings

COATING SOLUTION OF POLYETHERIMIDE MONOMERS

This invention relates to a coating solution of polyetherimide-forming monomers including a trifunctional amine in a solvent system including an organic solvent and optionally water as components thereof.

U.S. Pat. No. 3,440,197 (Edith M. Boldebuck and Fred F. Holub) discloses coating solutions prepared from a mixture of an aromatic polycarboxylic acid and an aromatic diamine dissolved in a solvent mixture comprising water and a water-soluble monofunctional secondary or tertiary amine, wherein the concentrations are in the range from 5 to 50 percent, by weight reactants and 50 to 95 percent, by weight solvent mixture. Although the coating solutions are capable of being converted by the application of heat to high temperature protecting and insulating films, a substantial amount of energy is required to remove the relatively high amount of solvent mixture in the process of forming the films.

U.S. Pat. No. 3,518,219 (Lavin et al.) discloses a high solids solution of particular polyimide-forming monomeric reactants, e.g., a polyamine and tetracarboxylic acid formed from two molecules of trimellitic acid joined through their free carboxylic groups, in various inert organic liquids, such as lower alkyl alcohols, acetone, methylethyl ketone, cresol, toluol, N-methylpyrrolidone, dimethylacetamide, diamide, etc. Lavin et al. also disclose that mixtures of water with acetone and ethyl alcohol may be used where the solubility of the particular monomers permit. However, the tetracarboxylic acid and polyimides formed therefrom are highly susceptible to hydrolytic degradation of the ester linkage.

U.S. Pat. No. 3,905,942 (Takekoshi and Kochanowski) discloses a method for making a polyetherimides involving reaction of aromatic bis(etherdicarboxylic acid)s and organic diamines in the presence of a nonpolar organic solvent or phenolic solvent, at temperatures of at least 130° C. It is known that the viscosities of amide-rich aqueous systems of various amides, for example N-methyl pyrrolidone, N,N-dimethylformamide, and N,N-dimethylacetamide, are higher than the viscosities of the corresponding amides, as shown by Assarson et al., Advances in Chemistry, Vol. 84, pages 1–11 (American Chemical Society).

U.S. Pat. No. 4,115,341 discloses a solution of an ether-acid-amide polymer in glycol ether solvents that can be used as a wire enamel. This material is only slightly imidized, e.g. less than 5%, and needs a low solids content of less than 20% and usually between 5 and 10% to achieve the desired solution viscosity. Recently U.S. Pat. No. 4,157,996 (Boldebuck and Banucci) disclosed a wire enamel based on polyetherimide monomers. This solution had the required high-solids content, for example, greater than 50%, and could be cast into cured films with good properties.

Disclosed is a coating solution including an aromatic bis(ether dicarboxylic acid) component, an organic diamine component and a solvent system including a water-soluble organic solvent component, which may be a dipolar aprotic solvent or a monoalkyl ether of ethylene glycol or of diethylene glycol, and optionally water.

U.S. Pat. No. 2,935,487 (Fox and Zavist), U.S. Pat. No. 3,211,585 (Meyer and Zalewski), U.S. Pat. No. 4,096,291 (Dunwald, Lewalter, Zecher and Last) disclose the use of polymerized isocyanates such as cyanurates as additives for their isocyanate character which crosslinks by reacting with excess —OH groups, e.g. in polyesterimide enamel, but not for use as triamine precursors.

Resin solutions based on polyimide chemistry use several methods to achieve needed high temperature properties. Polyesterimides incorporate trifunctional alcohols into the polyester portion of the material to attain the necessary crosslinking. Polyimides are prepared with many of the amines present as amic acids where the acid aids solubility until during cure the imide is formed, creating insolubility.

The amide imides generally have excess amine groups which along with the methylene group in the methylene dianiline gives the crosslinking mechanism. For example, the methylene is oxidized from heating and the resultant carbonyl reacts with the excess amine to form crosslinks.

A process that depends upon high temperature atmospheric oxidation is not easily controlled therefore a system that would not require thermal oxidation for crosslinking was desirable.

It has now been found by practice of the present invention that coating solutions of aromatic bis(ether anhydrides), organic diamines and organic triamines can be prepared in a suitable solvent system which do not require thermal oxidation for crosslinking. The anhydrides are not directly used but rather are converted to the tetrafunctional acids or their half esters by reaction with water or with water mixed with monofunctional alcohols. The amine, the amine mixture, or amine precursor is added to the solution to form a high solids wire enamel. The trifunctional amine provides crosslinking without the necessity for oxidative crosslinking. The degree of crosslinking can therefore be controlled by regulating the amount of triamine present in the coating solution which is accountable for crosslinking. The coating solutions of the present invention with triamine will cure at temperatures well below the temperatures needed for oxidative crosslinking. This low cure temperature, e.g. as low as 250° C., eliminates oxidative crosslinking and provides a degree of crosslinking which is controllable and reproducable. The time required for curing is also substantially shortened, e.g. by 50 percent or more. The resins when cured yield flexible films with very high cutthrough temperatures. Advantageously, the solutions can be prepared at temperatures below 100° C. including room temperature. The coating solutions, which may include the monomeric reactants in high concentrations, typically are characterized by good stability against change in composition and viscosity. The solutions may be coated on substrates and subsequently heated to remove the solvent system to form high quality polyetherimide coatings, which typically have good thermal stability and excellent flexibility.

Generally stated, the coating solution of the present invention includes (1) an aromatic bis(ether anhydride) having the formula,

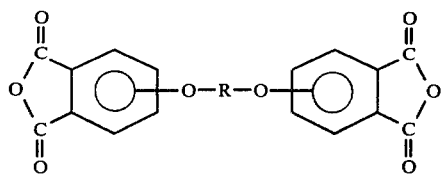

(2) an organic diamine having the formula,

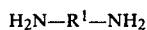  II (3) an organic triamine having the formula,

  III and (4) a suitable organic solvent where R is a member selected from the class consisting of (A) divalent organic radicals having the following formulas:

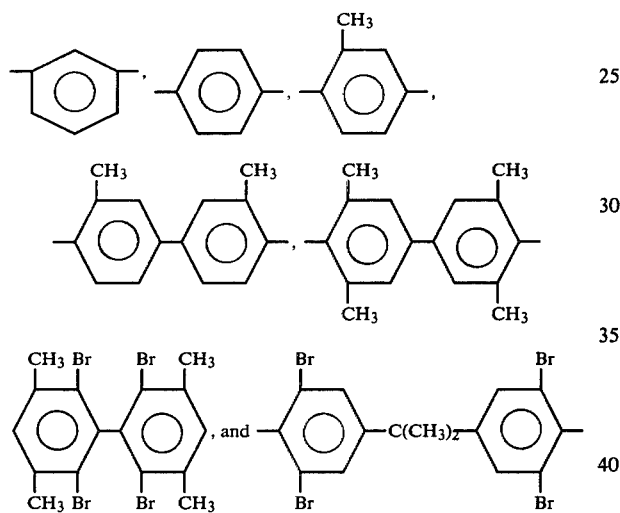

and (B) divalent organic radicals of the general formula:

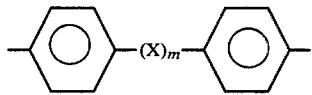

where m is 0 or 1 and X is a member selected from the class consisting of divalent radicals of the formulas,

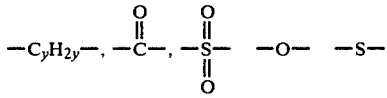

where y is an integer from 1 to 4; $R^1$ is a divalent organic radical selected from the class consisting of (a) aromatic hydrocarbon radicals having from 6 to about 20 carbon atoms and haloginated derivatives thereof, (b) alkylene radicals having from 2 to about 20 carbon atoms, and cycloalkylene radicals having from 3 to about 30 carbon atoms, (c) from $C_2$ to about $C_8$ alkylene terminated polydiorganosiloxane, and (d) divalent radicals of the general formula:

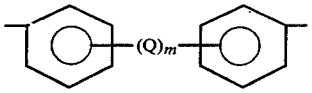

where m is as previously defined and Q is a member selected from the class consisting of

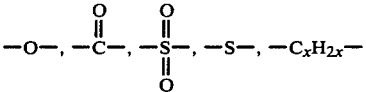

where x is an integer from 1 to 5 inclusive; and a method for preparing said coating solution; where $R^2$ is a member selected from the class consisting of (a) the following trivalent aromatic radicals

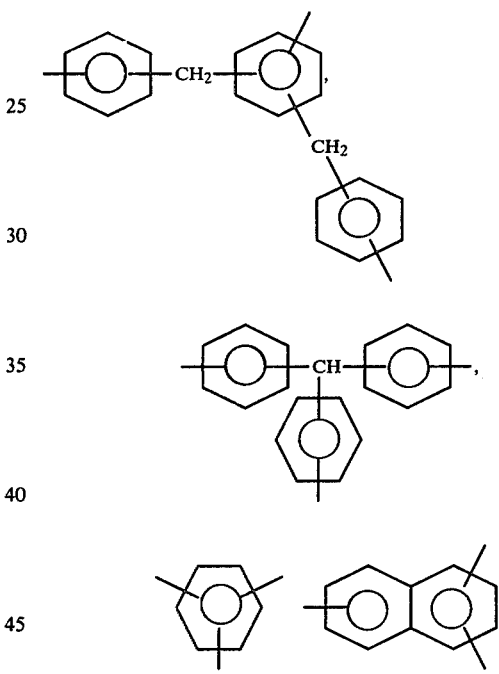

and the like; and (b) trivalent aliphatic radicals, for example,

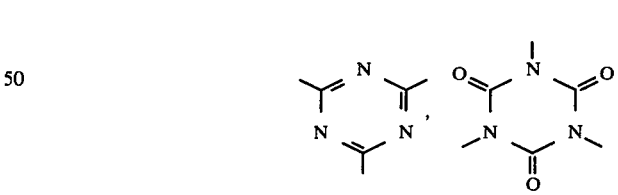

and the like, or combinations thereof.

Included by the aromatic bis(ether anhydride)s of formula I are compounds having the formulas,

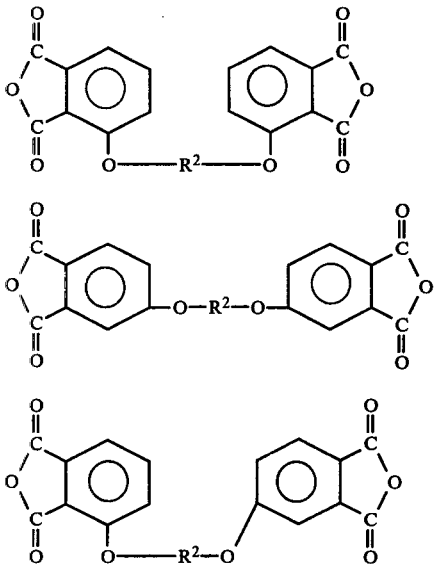

where R² is 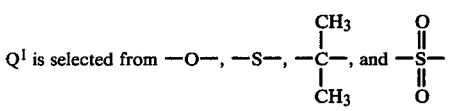 and

Q¹ is selected from —O—, —S—, $-\overset{\overset{\displaystyle CH_3}{|}}{\underset{\underset{\displaystyle CH_3}{|}}{C}}-$, and $-\overset{\overset{\displaystyle O}{\|}}{\underset{\underset{\displaystyle O}{\|}}{S}}-$ Dianhydrides included by formula IV are, for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,3-bis(2,3-dicarboxyphenoxy)benzene dianhydride;
1,4-bis(2,3-dicarboxyphenoxy)benzene dianhydride;
4,4'-bis(2,3-dicarboxyphenoxy)diphenylsulfone dianhydride.

Dianhydrides included by formulas V and VI are, for example, 2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenyxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'(3,4-dicarboxyphenoxy)-diphenyl-2,2-propane dianhydride, etc.

In addition to formulas IV–V above, aromatic bis(ether anhydride)s also included by formula I are shown by Koton, M. M.; Florinski, F. S.; Bessonov, M. I.; Rudakov, A. P. (Institute of Heteroorganic Compounds, Academy of Sciences, USSR) USSR No. 257,010, Nov. 11, 1969, Appl. May 3, 1967 and also dianhydrides shown by M. M. Koton, F. S. Florinski, Zh Org. Khin 4(5) 774 (1968).

Some of the aromatic bis(ether anhydride)s of formula I are shown in U.S. Pat. No. 3,972,902 of Darrell Heath and Joseph Wirth, filed Aug. 18, 1973 and assigned to the same assignee as the present invention. These dianhydrides can be prepared from the hydrolysis, followed by dehydration, of the reaction product of a nitro-substituted phenyl dinitrile with a metal salt of a dihydric phenol compound in the presence of a dipolar apriotic solvent. For example, a benzenoid compound of the formula,

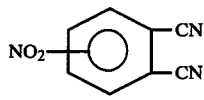

where the NO₂ group can be positioned anywhere in the benzene ring, can be reacted in dimethylformamide with an alkali metal salt of a dihydric phenol of the general formula,

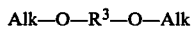

Alk—O—R³—O—Alk where R³ is a divalent aromatic radical and Alk is an alkali metal ion. Various well known procedures can be used to convert the resulting tetranitriles to the corresponding teraacids and dianhydrides.

Included are the alkali metal salts of the following dihydric phenols:

2,2-bis(2-hydroxyphenyl)propane;
2,4'-dihydroxydiphenylmethane;
bis(2-hydroxyphenyl)methane;
2,2-bis(4-hydroxyphenyl)propane hereinafter also identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3'-tetramethylbiphenyl;
2,4'-dihydroxybenzophenone;
4,4'-dihydroxydiphenyl sulfone;
2,4'-dihydroxydiphenyl sulfone;
4,4'-dihydroxydiphenyl sulfoxide;
4,4'dihydroxydiphenyl sulfide;
3,4'-dihydroxydiphenylmethane;
4,4'-dihydroxybenzophenone;
4,4'-dihydroxydiphenyl ether;
hydroquinone;
resorcinol, etc.

Included by the organic diamines of formula II, are, for example, m-phenylenediamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
4,4'-diaminobenzophenone;
bis(p-β-methyl-o-aminopentyl)benzene;

1,3-diamino-4-isopropylbenzene;
1,3-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
3,3-dimethylpropylenediamine;
octamethylenediamine;
3-methoxyhexamethylenediamine;
2,5-dimethylhexamethylenediamine;
2,6-dimethylheptamethylenediamine;
2-methylheptamethylenediamine;
5-methynonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(3-aminobutyl)tetramethyldisiloxane; etc.

Triamines which can be used in the process of the present invention include 2,4-bis(p aminobenzyl)aniline, hereinafter also known as "BABA", melamine, 2,4,6-triethylene amine cyanurate, 1,3,5 triethylene amine isocyanurate, 1,3,5 tri(3 amino 4 methylphenyl-)isocyanurate and other isomers thereof and the like. Triamine precursors may also be used; such as 1,3,5 tri[(4 methyl-3 isocyanato)phenyl]isocyanurate which is commercially available from Mobay Chemical Company as major component of Mondur SH ® blocked polyisocyanate, this trifunctional amine precursor reacts with anhydride or hydrolized anhydride groups under the influence of heat to form the imide groups and consequently crosslinks the polymer.

Solvents which can be used in the process of the present invention include phenol and mixtures of o—, p and m cresols known as cresylic acid and mixtures of cresylic with phenol. In addition phenolic solvent also includes ethylphenols, isopropylphenols, tet-butyl-phenols, xylenols, mesitols, chlorophenols, dichlorophenols, phenylphenols, etc. The organic solvent component may also be a water-soluble dipolar aprotic solvent or a monoalkyl ether of ethylene glycol having from 1 to about 4 carbon atoms in the alkyl group, a monoalkyl ether of diethylene glycol having from 1 to about 4 carbon atoms in the alkyl group, a monoaryl ether glycol or a monoaryl ether of propylene glycol or mixtures thereof. Suitable dipolar aprotic solvents include, for example, N-methyl-2-pyrrolidone, N,N-dimethylformamide, N,N-dimethylacetamide, dimethylsulfoxide, tetramethylurea, mixtures thereof, and the like. Suitable monoalkyl or monoaryl ethers of ethylene glycol include, for example, methyl cellosolve, ethyl cellosolve, propyl cellosolve, butyl cellosolve, phenoxy ethanol, mixtures thereof, and the like. Suitable monoalkyl ethers of diethylene glycol include methyl ether, ethyl ether, propyl ether, butyl ether, mixtures thereof, and the like. Suitable monoalkyl or monoaryl ethers of propylene glycol include, for example, propylene glycol phenyl ether, propylene glycol methyl ether, etc. Also included are glycol ether-esters, glycol ether-acetates, glycol ether-butyrates, glycol ether-propionates, and the like. Solvents preferred herein are methyl ether, mixtures of methyl ether, and butyl ether and N-methyl pyrrolidone.

In general, the organic amine component may be included in an amount of from 0.5 mole to about 2.0 moles, preferably from about 1 to about 1.3 moles, per mole of aromatic bis(ether annydride) component. The triamine component may be present in an amount of from about 1.0 to about 60 percent by weight of the total amine content. Where more than one compound is included in a component of the present solution, the parts, moles, or other quantity of such component is taken as the sum of the parts, moles, or such other quantity, respectively, of each compound included in such component. Thus, for example, total amine content is calculated by adding the equivalent amounts of both diamine and triamine components e.g. 2×(number of moles of diamine)+3+(number of moles of triamine)=total equivalents of amine.

Total anhydride content is calculated in a similar fashion. A slight excess of amine is usually desirable for flim flexibility or possible cross-linking. It has been found that polyetherimide enamel can have from about 5 to 500 repeating dianhydride-diamine reaction product units and preferably from 10 to 200. Terminal amino and phthalic acid or phthalic anhydride end groups can be present.

Experience has shown that sufficient solvent should be utilized to provide a solids content to provide a solution with a workable viscosity for stirring and handling.

Solutions having high ratios of monomeric reactants to organic solvent component advantageously minimize the amount of organic solvent released during subsequent formation and cure of polyetherimide resins as in coating operations. Such solutions having high amounts of monomeric reactants may have higher viscosities than desired for some coating applications. Typically, inclusion of water decreases the solution viscosity. A given decrease in viscosity may be effected using a lower amount of added water relative to the amount of added organic solvent component which would be required to effect the same viscosity decrease.

Water may be present in any amount up to the maximum amount at which the solution is substantially free of precipitate. Although water is miscible with the organic solvent component in substantially all proportions, inclusion of too much water in the present monomeric solution results in precipitate or other pluralphase formation. The amount of water which may be present depends on the particular bis(ether anhydride) and diamine components, the particular organic solvent component, and the weight ratio of monomeric reactants to organic solvent.

Advantageously, the present coating solutions may include the monomeric reactants in a combined amount of 40 or more percent, e.g. from 40 to about 75 or more percent based on the weight of the solution. In general, such high monomer content solutions, including water as may be required, have suitable viscosities in the temperature range, e.g. about 20° to about 40° C., normally used in metal conductor (e.g. wire) enameling operations for employment therein.

The solution may be prepared by mixing the anhydride, water and solvent as by stirring until the bis(ether anhydride) component is dissolved. Then the monomeric diamine and triamine are added and the solution stirred until the amines dissolve.

Solutions including water are more easily prepared by adding the monomeric reactant components with stirring to a solution of the water and organic solvent component. Preparation of the solution is generally accelerated at elevated temperatures.

The polyetherimide reaction products can be reinforced with conventional fillers, for example, perlite, fume silica, etc., carbon whiskers, glass fibers, etc. at proportions of from 10 to 60 parts of filler, per 100 parts by weight of polyetherimide.

The liquid coating solutions of the present invention have many and varied uses. The coating solutions may be applied to a variety of substrates using any suitable coating method, e.g. dipping, brushing, spraying, wiping and the like, and thereafter heated to evaporate the solvent system and form cured polyetherimide resinous coatings. The temperature is preferably increased gradually to produce smooth resinous coatings. The polymerization and cure proceeds advantageously at a temperature of from 125° C. to about 300° C. or more.

The present coating solutions may be employed as wire enamels to form resinous insluating coatings on copper and aluminum wire, as varnishes for coating or impregnating various substrates such as coils of previously insulated wire (e.g. in motor and generator coils), woven and non-woven fabrics, etc. Additives, e.g. light stabilizers, oxidation inhibitors, surfactants, etc., may be included in the present coating solutions.

For utilization as wire enamels, the present coating solutions desirably have a viscosity from about 200 to about 10,000, preferably from about 500 to about 2500, centistokes at 25° C.

The coating solutions may be applied immediatly upon preparation or stored prior to use. In general, maximum storage life can be obtained by storing the solutions under a nitrogen blanket in the absence of light.

In order that those skilled in the art will be able to practice the invention, the following examples are given by way of illustration and not by way of limitation. All parts are by weight.

EXAMPLES

Monomer solutions of the present invention including 2,2-bis[4-(3,4-dicarboxyphenoxy)phenyl]propane (dianhydride) as the aromatic bis(ether anhydride) component, 4,4'methylene dianiline (MDA) as the organic diamine component, and 2,4-bis (p aminobenzyl)aniline (BABA) as the triamine component were prepared in solvent mixtures of water and organic solvents. In the following table for the control coating solution, 520 grams (2 eq) of 2,3-bis[4-(3,4-dicarboxyphenoxy)-phenyl]propane dianhydride was heated with 108 g of water and 600 g of monomethylether of diethylene glycol. When the anhydride was dissolved, 204 g of (2.06 equiv.) 4,4'-methylenedianiline was added to yield the control monomer solution containing 3% excess amine. For the other examples in the table the listed percent of diamine was replaced with triamine so as to keep the total equivalents of amine constant. Cut-through temperatures in the examples were determined by a test wherein a cured film is placed between two bare copper wires crossed at a 90° angle in a cut-through apparatus commonly employed by the electrical industry in the evaluation of enameled magnet wire J.A.N.-W-583 (Apr. 7, 1948). The copper wires are electrically insulated from a metal base plate by 5-mil mica sheet. The test apparatus is then placed in an air circulating oven with the copper wires connected to a 110-volt AC circuit containing an alarm system. A 1000 gram-load is placed on the crossed wire pair. The loaded film resting between the crossed wires is heated in an air-circulating oven at a rate of about 10° C. per minute. The cut-through temperature is the temperature at which the crossed wires short circuit, i.e., electrical contact is made between the wires through the film, as indicated by activation of the alarm.

TABLE 1

Films from BPADA, MDA and Triamines
Cure - 10' at 150° C., 10' at 200° C., 5' at 250° C., 10 min at 300° C.

| Example | Crosslinker | Diamine Replaced by Triamine | Cut-Through °C. |
|---|---|---|---|
| | Monomethylether of diethyleneglycol Solvent | | |
| 1 | Control | — | 300 |
| 2 | Triamine - BABA | 15% | 360 |
| 3 | Triamine - BABA | 35% | 400+ |
| 4 | Triamine - BABA | 50% | 400+ |
| 5 | Mondur SH ®[1] | 17% | 375 |
| 6 | Mondur SH ®[1] | 28% | 400+ |
| 7 | Mondur SH ®[1] | 40% | 400+ |
| | N—methyl pyrrolidone Solvent | | |
| 8 | Control | — | 300 |
| 9 | Triamine - BABA | 15% | 400+ |
| 10 | Mondur SH ®[1] | 16% | 380 |

[1]Mobay Chemical Company registered trademark for phenol blocked polyisocyanate adduct of 2,4 toluene diisocyanate.

Other modifications and variations of the present invention are possible in light of the above teachings. It is, therefore, to be understood that changes may be made in the particular embodiments described above which are within the full intended scope of the present invention as defined in the appended claims.

What is claimed is:

1. A monomeric coating solution comprising
  (1) an organic residue selected from the group consisting of acidic derivatives of aromatic bis(ether anhydride) and esterified derivatives of aromatic bis(ether anhydride) obtained from monofunctional alcohols, said bis(ether anhydride) having the formula:

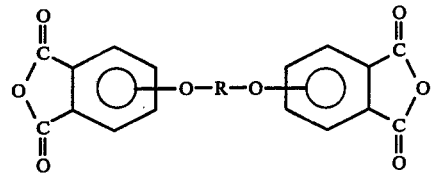

(2) an organic diamine having the formula:

(3) an organic triamine having the formula:

$R^2(NH_2)_3$ (4) water and
  (5) a suitable organic solvent where R is a member selected from the class consisting of (A) divalent organic radicals having the following formulas:

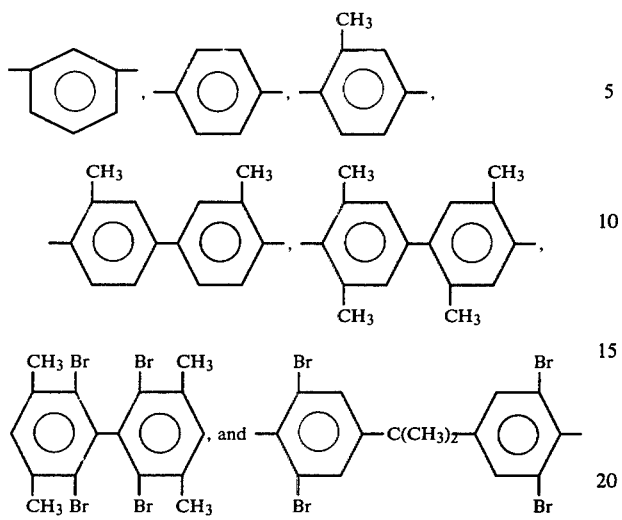

and (B) divalent organic radicals of the general formula:
an (B) divalent organic radicals of the general formula:

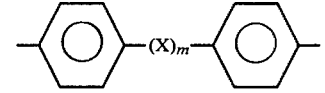

where m is 0 to 1 and X is a member selected from the class consisting of divalent radicals of the formulas,

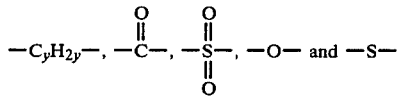

where y is an integer from 1 to 4, $R^1$ is a divalent organic radical selected from the class consisting of (a) aromatic hydrocarbon radicals having from 6 to about 20 carbon atoms and haloginated derivatives thereof, (b) alkylene radicals having from 2 to about 20 carbon atoms, and cycloalkylene radicals having from 3 to about 30 carbon atoms, (c) from $C_2$ to about $C_8$ alkylene terminated polydiorganosiloxane, and (d) divalent radicals of the general formula:

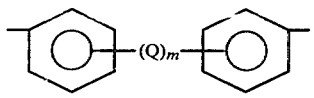

where m is as previously defined and Q is a member selected from the class consisting of:

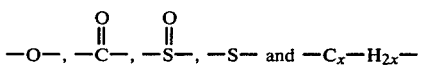

where x is an integer from 1 to 5 inclusive and $R^2$ is a member selected from the class consisting of (a) the following trivalent aromatic radicals:

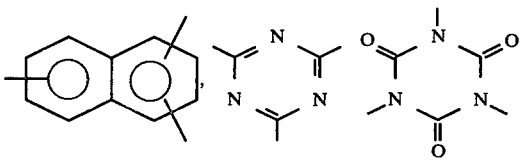

and (b) trivalent aliphatic radicals, or combinations thereof.

2. The coating solution of claim 1 wherein the diamine is used in a ratio of between 0.5 and 2.0 moles diamine per mole of dianhydride.

3. The coating solution of claim 1 wherein the diamine is used in a ratio of between 1.0 and 1.3 moles diamine per mole of dianhydride.

4. A coating solution of claim 1 where the aromatic bis(ether anhydride) is

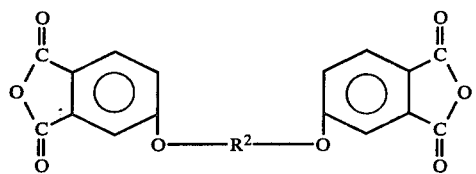

where $R^2$ is

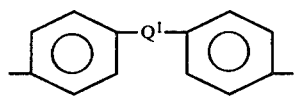

and $Q^1$ is selected from

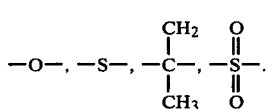

5. A coating solution of claim 1 where the aromatic bis(ether anhydride) is

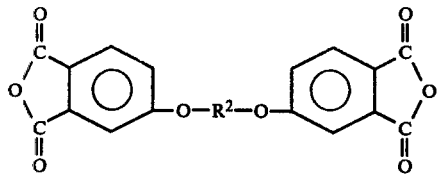

where R² is as previously defined.

6. A coating solution of claim 1 where the organic diamine is methylene dianiline.

7. A coating solution of claim 1 where the organic diamine is oxydianiline.

8. The coating solution of claim 1, where the aromatic bis(ether anhydride) is 2,2-bis[4-(3,4-dicarboxyphenoxy)phenyl] propane dianhydride and the orgainic diamine is 4,4'-methylene-dianiline.

9. The coating solution of claim 1 where the triamine is 2,4-bis(p aminobenzyl)aniline.

10. The coating solution of claim 1 where the triamine is melamine.

11. The coating solution of claim 1 where the triamine is obtained by the hydrolysis of a phenol blocked polymeric 2,4 toluene diisocyanate.

12. The coating solution of claim 1 wherein the triamine is used in a ratio of between 1 percent to about 60 percent by weight of bis(ether anhydride).

13. An insulated electrical conductor coated with the solution of claim 1.

14. An insulated electrical conductor coated with the solution of claim 9.

15. An insulated electrical conductor coated with the solution of claim 10.

16. An insulated electrical conductor coated with the solution of claim 11.

17. A coating solution of claim 1 wherein said organic solvent comprises a monofunctional alcohol.

18. A coating solution comprising:
(1) a monomeric acidic derivative of 2,2 bis[4,(3,4-dicarboxy phenoxy phenyl]propane dianhydride.
(2) 2,4 bis (p-aminobenzyl aniline)
(3) 4,4 methylene dianiline
(4) water and
(5) N-methyl pyrrolidone solvent.

19. A coating solution comprising:
(1) a monomeric residue selected from the group consisting of acidic derivatives and esterified derivatives of 2,2 bis(4,(3,4 dicarboxy phenoxy) phenyl) propane dianhydride obtained from the monomethyl ether of diethylene glycol and water
(2) 2,4 bis(p-amino benzyl aniline)
(3) 4,4 methylene dianiline
(4) water and
(5) the monomethyl ether of diethylene glycol.

* * * * *